United States Patent [19]

Takahashi et al.

[11] 4,357,261
[45] Nov. 2, 1982

[54] METHOD FOR MANUFACTURE OF A COMPOSITE COPPER-ARSENIC COMPOUND MIXTURE

[75] Inventors: Nobuo Takahashi, Niihama; Hirao Toda, Saijo, both of Japan

[73] Assignee: Sumitomo Metal Mining Company Limited, Tokyo, Japan

[21] Appl. No.: 166,860

[22] Filed: Jul. 8, 1980

[30] Foreign Application Priority Data

Jul. 16, 1979 [JP] Japan .................................. 54-90065

[51] Int. Cl.$^3$ ................................................ C09K 3/00
[52] U.S. Cl. .............................. 252/385; 106/15.05; 424/133; 424/140; 424/143
[58] Field of Search .................... 252/385; 423/36, 45, 423/47, 87, 544, 601, 602; 75/24, 25, 6, 99, 115, 117; 204/DIG. 13; 427/440; 424/133, 140, 143; 106/15.05, 18.28, 2

[56] References Cited

U.S. PATENT DOCUMENTS

| | | | |
|---|---|---|---|
| 2,112,102 | 3/1938 | Klumpp | 423/602 |
| 2,686,114 | 8/1954 | McGauley | 423/602 |
| 3,917,519 | 11/1975 | Fisher et al. | 423/602 |
| 3,964,901 | 6/1976 | Swinkels | 423/47 X |
| 4,103,000 | 7/1978 | Hartford | 424/137 |
| 4,118,243 | 10/1978 | Sandesara | 423/87 |
| 4,218,249 | 8/1980 | Hill | 424/137 |
| 4,224,927 | 1/1981 | Reynolds et al. | 423/602 |
| 4,247,329 | 1/1981 | Mills | 424/137 |

*Primary Examiner*—J. L. Barr
*Attorney, Agent, or Firm*—Watson, Cole, Grindle & Watson

[57] ABSTRACT

From a refinery's intermediate byproduct composed of a sulfide, oxide or arsenide containing copper and arsenic, a liquid extract containing copper and arsenic at a concentration ratio of not less than 1.0 is obtained. The liquid extract is cooled to a predetermined temperature to achieve solid-liquid phase separation, and the liquid resulting from the phase separation is neutralized to pH 6-7 to isolate copper and arsenic in the form of a composite precipitate. The composite copper-arsenic compound mixture thus obtained has a high purity and low production cost and can be converted through a simple treatment into an effective antiseptic for wood.

13 Claims, 1 Drawing Figure

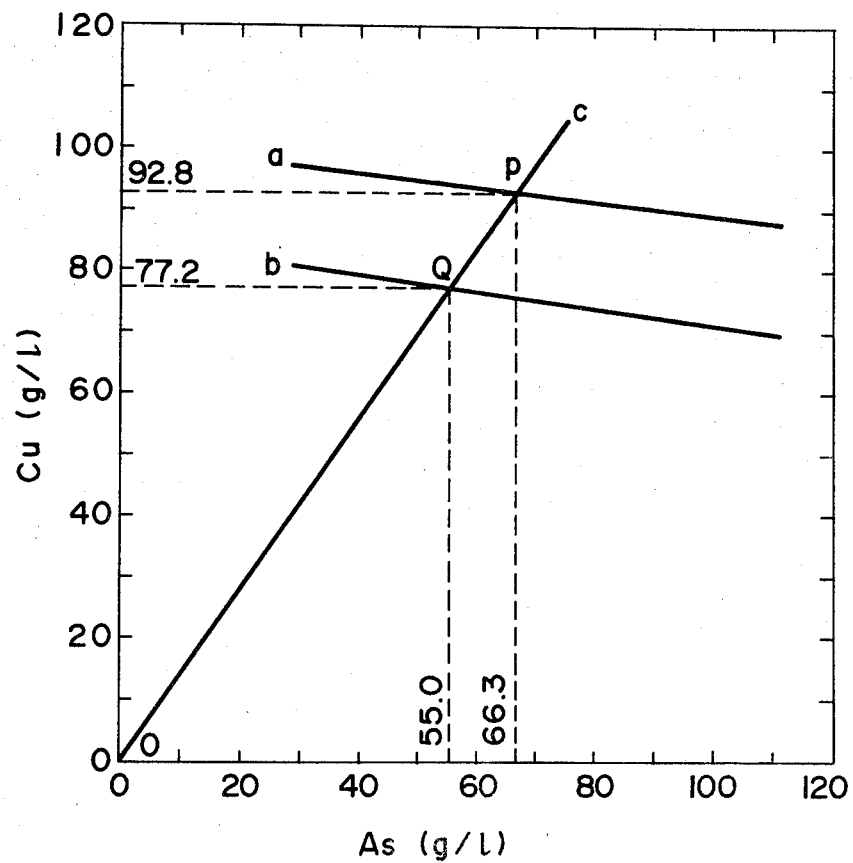

METHOD FOR MANUFACTURE OF A COMPOSITE COPPER-ARSENIC COMPOUND MIXTURE

BACKGROUND OF THE INVENTION

1. Field of the Invention

This invention relates to a method for the manufacture of a composite copper-arsenic compound mixture from a nonferrous smelter's or refinery's intermediate byproduct containing copper and arsenic, the composite copper-arsenic compound mixture being useful as an intermediate for the production of a chromium-copper-arsenic type wood antiseptic.

2. Description of the Prior Art

Antisepsis of wood is carried out by either compressively injecting a solution of antiseptic chemicals into wood, by spreading such a solution on wood, by spraying wood with the solution, or by immersing wood in an aqueous solution of the antiseptic agent. Of the noted methods, the most effective and most extensively practiced method is the one which resorts to the compressive injection of the antiseptic solution.

Chemicals which are used in the compressive injection method include creosote, which is an oily substance, and phenol-inorganic fluoride and chromium-copper-arsenic compounds, which are soluble in water. Of these chemicals, the most advantageous is the chromium-copper-arsenic compound. The antiseptic agent prepared from the chromium-copper-arsenic compound not only produces an antiseptic effect but it also exhibits a conspicuous ability to repel ants, and it also displays great adhesiveness to wood. This agent, therefore, will tend not to flow out of the wood to which it is applied and undesirably smear articles placed nearby.

At present, the chromium-copper-arsenic compound type agent (hereinafter referred to briefly as "CCA type agent") is prepared by users (persons engaging in the business of antisepticizing wood) by purchasing the individual chromium, copper and arsenic compounds, and then dissolving them in water according to a prescribed formula.

As the raw materials for the CCA type agent, chromium trioxide or potassium dichromate is used as the source of chromium, cupric oxide or copper sulfate as the source of copper, and arsenic acid or pyroarsenic acid as the source of arsenic. The proportion in which these compounds are combined to form the agent is fixed in Japan by Japanese Industrial Standard K-1554 as shown in Table 1, for example. The dealers engaging in the business of wood antisepsis formulate the CCA agent in accordance with this standard.

TABLE 1

| | | |
|---|---|---|
| | $K_2Cr_2O_7$ | 50 ~ 60 weight % |
| No. 1-A | $CuSO_4.5H_2O$ | 30 ~ 37 |
| | $As_2O_5.2H_2O$ | 10 ~ 13 |
| | $CrO_3$ | 59 ~ 67 weight % |
| No. 1-B | $CuO$ | 16 ~ 20 |
| | $H_3AsO_4$ | 17 ~ 21 |

When the CCA type agent is prepared in accordance with the formula of No. 1-A, however, the $K^+$ ions and the $SO_4^{2-}$ ions inevitably enter as impurities into the agent. Even after the agent has been injected into wood and the chromium, copper, arsenic, etc., have been deposited fast in wood, these ions continue to exist in their water-soluble states. When the antisepticized wood is exposed to rainwater or some other form of water, therefore, these ions are caused to dissolve out of the wood. The escape of these ions is undesirable.

Since these ions act to enhance electric conductivity, the wood which has been antisepticized with the CCA agent described above may allow current leakage when it is used as an electric pole. If $SO_4^{2-}$ and other an ions are present in a large amount in the agent at the time the agent is applied to wood, the agent causes corrosion in pressurized containers, pumps, pipes and other iron materials. Thus, the materials used in antisepticizing facilities are limited in this respect. Further, there is the possibility of the CCA agent causing corrosion on nails and other metallic articles used in and on the antisepticized wood.

Since the CCA agent of the aforementioned formula No. 1-A suffers from such drawbacks as described above, the CCA agent of the formula No. 1-B, which does not permit inclusion of $K^+$ and $SO_4^{2-}$ ions, proves to be more desirable insofar as it does not entail such drawbacks. In the preparation of the CCA agent of the formula No. 1-B, however, cupric oxide is required to be used as the source of copper and it must be dissolved in chromium trioxide and arsenic acid or pyroarsenic acid.

Unfortunately, cupric oxide is not a readily soluble substance. It becomes necessary, therefore, to prepare an aqueous solution containing arsenic acid or pyroarsenic acid in a very high concentration (on the order of 60% by weight of $H_3AsO_4$, for example), and to blend stated amounts of chromium trioxide and cupric oxide in the aqueous solution to cause a reaction and produce a highly viscous and aqueous solution as a preparatory step. Since this dissolution entails evolution of heat, it is not easy work.

Moreover, each of the utilized arsenic acid, pyroarsenic acid, cupric oxide or copper sulfate are required to have a fairly high purity, and such high purity materials are expensive; thus the production costs for the CCA agent are high. Use of the formula No. 1-B, therefore, involves many problems.

An object of this invention, therefore, is to provide a method for efficient manufacture of a composite copper-arsenic compound mixture which can be used as an intermediate for producing the CCA type agent which avoids the aforementioned problems encountered by the prior art.

SUMMARY OF THE INVENTION

After many experiments, the inventors have established a method for the manufacture of a composite copper-arsenic compound mixture, more specifically a composite mixture of copper arsenate and copper hydroxide, which has a required copper-arsenic ratio by using, as the raw material, a refinery's intermediate byproduct containing copper and arsenic using such an intermediate byproduct saves the cost of copper and arsenic compounds necessary for the preparation of the CCA type agent. According to the present invention, a liquid extract having a Cu/As ratio of not less than 1 is obtained by forming a refinery's intermediate byproduct composed of a sulfide containing copper and arsenic into a slurry with water and adding to the slurry a water-soluble cupric salt in such an amount as to provide a copper concentration of not less than 20 g/liter of water; or forming a refinery's intermediate byproduct composed of a arsenide and/or oxide containing copper and arsenic into a slurry with water, adding to the slurry at least one equivalent of sulfuric acid based on the copper content in the refinery's intermediate byproduct, and thereafter extracting copper and arsenic from the resultant mixture.

The liquid extract is subjected to solid-liquid phase separation, and the liquid resulting from the phase separation is adjusted to a pH 6–7 by addition of an alkali to effect separation and copper and arsenic collectively as a composite precipitate.

Further objects, advantages and features of the present invention will become more fully apparent from a detailed consideration of the arrangement and construction of the constituent parts as set forth in the following specification taken together with the accompanying drawing.

BRIEF DESCRIPTION OF THE DRAWING

The FIGURE is a graph showing the proportion of the dissolved copper sulfate to the aqueous solution of arsenic acid, represented in terms of the relation between the As concentration and the Cu concentration.

DETAILED DESCRIPTION OF THE INVENTION

The refinery's intermediate byproduct containing copper and arsenic and used as the raw material for the product of this invention is obtained in the form of the flue dust and various precipitates occurring at varying stages of the operation of the nonferrous smelter or refinery.

Particularly the arsenic in the elements which are contained in the refinery's intermediate byproduct entails difficult recovery and other troublesome treatments and is concentrated, as an unwanted material.

The refinery's intermediate byproduct mentioned above comes in various forms; a sulfide, an oxide, and an arsenide having copper and arsenic in a combined state.

The first step in the method of this invention consists in extracting copper and arsenic from such byproduct raw material, thereby obtaining a liquid extract containing copper and arsenic at a concentration ratio of not less than 1.0.

In the aforementioned step of extraction, the copper and arsenic present in the raw material are caused to participate in their respective whole amounts in the reaction of extraction and, consequently, are converted into copper sulfate and arsenic acid. When the concentrations of the copper sulfate and arsenic acid in the liquid extract to be obtained fall in the zones below the respective values of solubility, the concentration ratio between copper and arsenic in the liquid extract is substantially equal to that between copper and arsenic in the raw material. When the raw material is subjected to extraction under the conditions mentioned above to produce a liquid extract which contains copper and arsenic at a desired concentration ratio, the Cu to As ratio in the raw material is required to be equal to the desired value mentioned above. It is very difficult to satisfy these conditions at all times.

Actually, the Cu/As ratio in the raw material may be greater in some cases and smaller in other cases than the desired value.

With the occurrence of such a discrepancy, possible measures available for the correction necessary to equalize the actual Cu/As ratio to the desired value may consist in adjusting the amount of either the copper or the arsenic. From the refinery's standpoint, it is desirable to prevent arsenic from accumulating in the refining operation; thus, the correction of the actual Cu/As ratio is desirably effected by adjusting the amount of copper and allowing the whole amount of arsenic to be used up in the formation of the product.

The correction of the Cu/As ratio by the adjustment of the amount of copper in the raw material can be accomplished, when the copper content comes short of satisfying the desired Cu/As ratio, by adding to the raw material a copper salt such as copper sulfate, copper chloride and/or copper oxide in an amount appropriate for making up the shortage of copper. This method is impracticable, however, when the copper content in the raw material is in excess. Thus, the correction of the Cu/As ratio must take place during or after the step of extraction of copper and arsenic.

The adjustment of the Cu/As ratio required when the copper content in the raw material is insufficient can easily be accomplished by adding copper in the form of a water-soluble cupric salt to make up the shortage. Conversely, when the copper content in the raw material is in excess, it is not easy to remove accurately the excess copper selectively from the liquid extract.

Taking notice of the fact that the solubility of arsenic acid in water is very high and also the fact that the solubility of copper sulfate in the aqueous arsenic acid solution is not appreciably affected by the concentration of the arsenic acid, the inventors have now developed a method for effecting the correction of the Cu/As ratio in the liquid extract by removing from the system the excess copper in the form of copper sulfate through effective utilization of the two characteristic points mentioned above. This method will now be described with reference to the graph.

In the graph, the line a and the line b represent the concentrations of copper sulfate dissolved in the aqueous solution of arsenic acid respectively at 30° C. and 20° C., in terms of the relation between the Cu concentration and the As concentration, and the line c represents one typical set of conditions under which the Cu/As concentration ratio (g/liter) in the aqueous solution assumes the value of 1.4.

The conditions at the intersection P between the line a and the line c, therefore, are such that when the As concentration in the aqueous solution is fixed at 66.3 g/liter and the temperature of the aqueous solution is kept at 30° C., the copper concentration in this aqueous solution remains at 92.8 g/liter and the Cu/As ratio in the aqueous solution assumes the value of 1.4, no matter how much of excess copper sulfate may be present in the aqueous solution.

By the same token, the conditions at the intersection Q between the line b and the line c are such that when the As concentration in the aqueous solution is fixed at 55.0 g/liter and the temperature of the aqueous solution is kept at 20° C., the copper concentration in the aqueous solution remains at 77.2 g/liter and the Cu/As ratio assumes the value of 1.4.

The data indicate that even when the Cu/As ratio in the raw material is greater than the desired value and the copper is present therein in an excess amount, a liquid extract having a Cu/As ratio of 1.4 can be obtained and the excess copper can be removed in the form of copper sulfate crystals together with the extraction residue from the system by treating either the raw material or the liquid extract so as to adjust the arsenic concentration in the liquid extract to 66.3 g/liter and keeping the temperature of the resultant liquid extract at 30° C. The precipitate discharged from the system may be washed with a suitable amount of warm water to dissolve the copper sulfate crystals and then used as an electrolyte rich in copper.

Since the actual operation of extraction is carried out with the application of heat, the liquid extract contains an excess amount of dissolved copper before it is cooled to the stated temperature. If the insoluble residue is separated from the liquid extract while the extract still remains in its uncooled state, then the excess amount of copper can be separated afterward in the form of crystals from the system at the time the liquid extract is cooled.

The conditions for the reaction of extraction will now be described. As described previously, the raw material for the product of the present invention comes in the form of a sulfide, an oxide or an arsenide. Of the varying compound mentioned above which makes up the raw material, the sulfide is most difficult to extract, followed by arsenide and oxide.

When the raw material is composed of sulfides, the raw material and water are first prepared in such a quantitative proportion as to give rise to a desired arsenic concentration in the liquid extract to be obtained afterward and they are mixed to form a slurry. The slurry, with a suitable amount of copper sulfate, copper chloride and/or copper nitrate added thereto as a water-soluble cupric salt, is subsequently subjected to the steps of oxidation and extraction under high pressure. In this case, it is imperative that the cupric salt should be added to the slurry, no matter whether the raw material contains a sufficient amount of copper or not. The amount of the cupric salt thus added is such that the copper concentration in the aqueous solution will exceed 20 g/liter, preferably 50 g/liter. The reason for this specific addition is that if the water-soluble cupric salt is not added at all or if it is added in such an amount as to give a copper concentration of less than 20 g/liter, the speed of extraction of copper in the raw material is notably lowered and the arsenic component in the raw material, which is extracted at all, is not completely oxidized and, consequently, about 70% of the arsenic component remains in the form of As(III) as shown in Table 2 (showing the data obtained of an operation aimed at the Cu/As ratio of 1.4, with the system cooled to 30° C. after the step of extraction). The purpose of extracting from the raw material the whole amounts of copper and arsenic in the respective forms of Cu(II) and As(V), therefore, cannot be attained.

TABLE 2

| Amount of Copper added (g/liter) | Effect of amount of copper added ||||| Residual As (III) (g/liter) |
|---|---|---|---|---|---|---|
| | Cu || As || Cu/As ratio | |
| | Concentration (g/liter) | Ratio of extraction (%) | Concentration (g/liter) | Ratio of extraction (%) | | |
| 0 | 0.79 | 3.1 | 66.2 | 99.8 | 0.01 | 48.3 |
| 10 | 16.2 | 24.7 | 66.3 | 100 | 0.24 | 15.6 |
| 20 | 43.8 | 93.8 | 66.2 | 99.9 | 0.66 | 0.7 |
| 50 | 75.1 | 99.8 | 66.3 | 100 | 1.13 | 0 |
| 70 | 92.9 | 100 | 66.4 | 100 | 1.40 | 0 |

Note:
[1] Raw material: A sulfide containing copper and arsenic, obtained as the washings of the exhaust gas from the copper smelting furnaces, and composed of 4.07% of Cu, 10.6% of As, 11.9% of S and 63.5% of $H_2O$, respectively, by weight.
[2] Slurry concentration: 630 g (of the sulfide mentioned above)/liter.
[3] Extraction conditions: Temperature - 120° C., partial pressure of oxygen - 2 kg/cm$^2$, time of extraction - 3 hours, form of copper added - copper sulfate.
[4] The ratio of extraction embraces the copper component which is separated as crystals and included in the residue which is separated after the system has been subjected to extraction and then cooled to the stated temperature. This principle will invariably apply to all the ratios of extraction indicated in the subsequent tables.

The aforementioned effects which are brought about by the addition of the cupric salt may be explained by a postulate that Cu(II) catalytically functions during the oxidation of As(III) and the extraction of copper sulfide and increases the velocity of reaction.

From the results of extraction shown in Table 2, it may be understood that the copper present in the raw material was substantially completely extracted where the amount of copper added was 50 g/liter, that since the raw material used in the test had a low copper content, the Cu/As ratio of 1.4 aimed at would not be attained without an addition to the copper content even if the whole amounts of Cu and As were extracted, and that for the purpose of attaining this ratio, it was necessary to add copper to fill the shortage after the step of extraction or, as in the present case, to add a water-soluble cupric salt to the slurry of raw material enough to give rise to a copper concentration of 70 g/liter in the liquid before the step of extraction.

The conditions for the extraction to be performed on the raw material are not less than 1 kg/cm$^2$, preferably not less than 2 kg/cm$^2$, of partial pressure of oxygen, not less than 100° C., preferably not less than 120° C., of extraction temperature, and not less than 3 hours of extraction time. Although the aforementioned limits set for the extraction conditions may be partly accounted for by the nature of the raw material to be used, they are generally ascribable to the fact that the ratio of extraction to be attained is not sufficient when the conditions fall short of such limits. By was of comparative test, the raw material was treated by following the procedure in Table 2, except that the amount of copper added under the aforementioned conditions was fixed at 70 g/liter and the conditions of partial pressure of oxygen and extraction temperature and time were fixed at stated values, and the products of the treatment were cooled to 30° C. with a view to attaining the Cu/As ratio of 1.4. The results of this test are shown in Table 3 for referential purpose.

TABLE 3

| Partial pressure of oxygen | Extraction temperature | Extraction time 2.5 hours | | | | | Extraction time 3 hours | | | | | Extraction time 4 hours | | | | |
|---|---|---|---|---|---|---|---|---|---|---|---|---|---|---|---|---|
| | | Composition of liquid extract | | | | | | | | | | | | | | |
| | | Cu | | As | | | Cu | | As | | | Cu | | As | | |
| | | Concentration (g/l) | Ratio of extraction (%) | Concentration (g/l) | Ratio of extraction (%) | Cu/As ratio | Concentration (g/l) | Ratio of extraction (%) | Concentration (g/l) | Ratio of extraction (%) | Cu/As ratio | Concentration (g/l) | Ratio of extraction (%) | Concentration (g/l) | Ratio of extraction (%) | Cu/As ratio |
| 0.5 kg/cm² G | 100° C. | 84.0 | 57.1 | 46.3 | 69.8 | 1.81 | 86.8 | 68.2 | 53.3 | 80.4 | 1.63 | 88.0 | 72.6 | 55.5 | 83.7 | 1.58 |
| " | 130 | 89.9 | 80.2 | 55.8 | 84.2 | 1.61 | 92.2 | 89.1 | 62.2 | 93.9 | 1.48 | 93.1 | 92.9 | 63.6 | 96.0 | 1.46 |
| 1 | 100 | 87.6 | 71.1 | 55.8 | 84.2 | 1.57 | 89.6 | 78.9 | 60.1 | 90.7 | 1.49 | 90.9 | 84.2 | 62.1 | 93.7 | 1.46 |
| " | 130 | 93.1 | 92.9 | 64.2 | 96.8 | 1.45 | 93.0 | 100 | 66.2 | 99.8 | 1.40 | 92.8 | 100 | 66.3 | 100 | 1.40 |
| 2 | 90 | 89.4 | 78.3 | 56.3 | 84.9 | 1.59 | 91.1 | 85.0 | 60.1 | 90.6 | 1.52 | 92.6 | 90.9 | 63.1 | 95.2 | 1.47 |
| " | 100 | 91.0 | 84.7 | 58.9 | 88.9 | 1.54 | 93.1 | 92.8 | 63.2 | 95.3 | 1.47 | 92.7 | 97.1 | 663. | 100 | 1.40 |
| " | 120 | 92.2 | 89.4 | 63.4 | 95.6 | 1.45 | 92.9 | 99.9 | 66.3 | 100 | 1.40 | 92.8 | 100 | 66.4 | 100 | 1.40 |
| " | 130 | 93.6 | 94.8 | 64.9 | 97.9 | 1.44 | 92.8 | 100 | 66.3 | 100 | 1.40 | 92.9 | 100 | 66.3 | 100 | 1.40 |
| 3 | 90 | 90.9 | 84.2 | 60.3 | 91.0 | 1.51 | 92.5 | 90.3 | 63.2 | 95.3 | 1.46 | | | | | |
| " | 100 | 92.3 | 89.6 | 64.8 | 97.7 | 1.42 | 92.8 | 99.5 | 66.3 | 100 | 1.40 | | | | | |
| " | 120 | 93.0 | 94.3 | 65.2 | 98.3 | 1.43 | 92.9 | 100 | 66.4 | 100 | 1.40 | | | | | |
| " | 130 | 92.9 | 96.3 | 65.6 | 98.9 | 1.42 | 92.9 | 100 | 66.3 | 100 | 1.40 | | | | | |

When the raw material is composed of an arsenide having copper and arsenic combined therewith and/or an oxide containing copper and arsenic, the liquid extract having a desired Cu/As ratio can be obtained by first forming the raw material into a slurry by use of at least one equivalent of sulfuric acid, based on the copper content of the raw material, and water in a proportion such as to give rise to a desired arsenic concentration in the liquid extract to be obtained afterward, blowing air into the slurry at temperatures of not less than 50° C., preferably not less than 60° C., thereby allowing an extraction reaction to proceed on the slurry under atmospheric pressure for desirably for not less than three hours, and thereafter cooling the treated slurry to a predetermined temperature.

The conditions for the extraction are limited as indicated above because the ratio of extraction is not sufficient when the conditions fall short of these limits.

The extraction reaction which is caused on the raw material in the form of arsenide or oxide is believed to proceed as shown by the following equations.

$$Cu_3As + 3H_2SO_4 + (11/4)O_2 \rightarrow 3CuSO_4 + H_3AsO_4 + (3/2)H_2O$$

$$CuO + H_2SO_4 \rightarrow CuSO_4 + H_2O$$

$$As_2O_3 + 3H_2O + O_2 \rightarrow 2H_3AsO_4$$

The extraction treatment was tried, with the resultant extract cooled to 20° C. and the reaction temperature and time fixed at stated values, with a view to obtaining a fixed Cu/As ratio of 1.4 in the produced liquid extract. The results of this test are shown in Table 4 for referential purposes. As the raw material for this test, the slime (produced in the electrolysis for copper removal) of a composition shown below was used in the form of an aqueous solution containing the slime in a concentration of 229 g per liter (so as to give rise to an As concentration of 55 g/liter of slurry).

Composition of slime (in % by weight): Cu-50.4, As-24.0, SO₄-4.25 and H₂O-19.1.

TABLE 4

| Equivalent of sulfuric acid | Extraction temperature | Extraction time 2 hours | | | | | Extraction time 3 hours | | | | | Extraction time 4 hours | | |
|---|---|---|---|---|---|---|---|---|---|---|---|---|---|---|
| | | Composition of liquid extract | | | | | | | | | | | | |
| | | Cu | | As | | | Cu | | As | | | Cu | As | |
| | | Concentration (g/l) | Ratio of extraction (%) | Concentration (g/l) | Ratio of extraction (%) | Cu/As ratio | Concentration (g/l) | Ratio of extraction (%) | Concentration (g/l) | Ratio of extraction (%) | Cu/As ratio | Ratio of extraction (%) | Ratio of extraction (%) | Cu/As ratio |
| 1.0 | 60° C. | 77.7 | 94.3 | 51.6 | 93.8 | 1.50 | 77.2 | 100 | 55.1 | 100 | 1.40 | 99.9 | 100 | 1.40 |
| " | 80 | 77.5 | 97.7 | 53.2 | 96.8 | 1.46 | 77.2 | 100 | 55.0 | 100 | 1.40 | 100 | 100 | 1.40 |
| 1.5 | 40 | 78.6 | 84.2 | 45.5 | 82.7 | 1.73 | 77.9 | 93.0 | 51.0 | 92.7 | 1.53 | 95.7 | 94.2 | 1.50 |
| " | 50 | 78.0 | 92.1 | 50.2 | 91.3 | 1.55 | 77.3 | 98.2 | 53.5 | 97.2 | 1.45 | 100 | 99.9 | 1.40 |
| " | 60 | 77.4 | 96.8 | 52.8 | 96.0 | 1.46 | 77.1 | 100 | 54.9 | 99.9 | 1.41 | 100 | 100 | 1.40 |
| " | 80 | 77.2 | 100 | 54.0 | 98.2 | 1.43 | 77.1 | 100 | 55.0 | 100 | 1.40 | 100 | 100 | 1.40 |

In the test which gave the results of Table 4, since the Cu/As ratio (by weight) in the raw material was 2.1, the excess copper was removed in the form of copper sulfate crystals from the aqueous solution when the extract resulting from the extraction treatment was cooled to 20° C. In case where the copper content of a given raw material is insufficient relative to the arsenic content, the shortage of copper must be overcome, as described previously, by adding copper in the form of copper sulfate, copper chloride or copper oxide to the aqueous solution before the step of extraction or by adding copper in the form of a water-soluble cupric salt to the extract obtained afterward.

From the raw material which is in the form of a mixture of sulfide, arsenide and oxide, the extraction of arsenic and copper can be accomplished by forming the raw material into a slurry with water and then either subjecting the slurry directly to an oxidation treatment under high pressure and subjecting the resultant residue to a treatment for extraction or with sulfuric acid or adding to the slurry sulfuric acid in a proper amount relative to the arsenide and/or oxide content and subjecting the resultant mixture to an oxidative extraction under high pressure. The subsequent third step involves neutralizing with an alkali the liquid extract of desired Cu/As ratio resulting from the second step thereby fixing all the amounts of copper and arsenic in the form of a composite precipitate, and separating the composite precipitate from the aqueous solution.

The alkali to be used in the third step is not specifically limited insofar as it causes no hindrance to the subsequent treatment. Examples of alkalis which are advantageously used for the neutralization include sodium hydroxide, potassium hydroxide and ammonium hydroxide.

This step is characterized by the fact that the Cu/As ratio in the precipitate is equalized with that in the liquid extract by causing the whole amounts of copper and arsenic present in the liquid extract to be precipitated.

For this equalization of the Cu/As ratios, it is a prerequisite that the Cu/As concentration ratio in the liquid extract should be not less than 1.0 and the pH value of the extract should fall within the pH range of 6 and 7 at the end point of neutralization. The reason for the lower limit of 1.0 for the Cu/As ratio in the liquid extract is that, when the ratio falls below this limit, some of the arsenic content remains in the aqueous solution after the neutralization as shown in Table 5 and, as the result, the Cu/As ratio in the precipitate obtained afterward is greater than that in the liquid extract.

TABLE 5

| | Cu/As | 0.95 | 1.00 | 1.20 | 1.50 | 2.00 |
|---|---|---|---|---|---|---|
| Liquid extract | Cu (g/l) | 74.0 | 74.1 | 75.8 | 78.0 | 80.0 |
| | As (g/l) | 76.3 | 74.1 | 63.2 | 52.0 | 40.0 |
| Formed precipitate | Cu/As | 0.97 | 1.00 | 1.20 | 1.50 | 2.00 |

Note
[1]pH 6.5, normal room temperature
[2]Alkali used - Aqueous 250 g/liter sodium hydroxide solution As shown in Table 6, the reason for the range of 6 to 7 fixed for the pH value at the end point of neutralization is that, at a pH value below 6, both copper and arsenic are not thoroughly precipitated and arsenic is more readily precipitated than copper at lower pH values and, as the result, the Cu/As ratio in the precipitate is not equalized with but becomes smaller than that in the liquid extract and, at a pH value above 7, the arsenic which has once formed part of the precipitate is re-extracted by the alkali. Thus, the purpose of equalizing the two Cu/As ratios is not attained when the pH value deviates from the range of 6–7.

TABLE 6

| | 4.0 | 5.0 | 6.0 | 7.0 | 8.0 |
|---|---|---|---|---|---|
| pH value after neutralization | | | | | |
| Cu (g/l) content | 15.8 | 2.98 | 0.009 | 0.005 | <0.001 |
| As (g/l) content at end of neutralization | 0.13 | 0.018 | 0.006 | 0.005 | 0.84 |
| Cu/As ratio in formed precipitate | 1.06 | 1.34 | 1.40 | 1.40 | 1.43 |

As described above, this invention aims to produce a composite copper-arsenic compound mixture useful as an intermediate for the CCA type antiseptic agent for wood by using as the raw material the refinery's intermediate containing copper and arsenic which occurs in the nonferrous smelter or refinery and has heretofore defined economic disposal. The product obtained by the method of this invention is, more specifically, a mixture of a composite copper-arsenic compound, $Cu_mH_{(3n-2m)}(AsO_4)_n \cdot xH_2O$ (wherein, m=1 to 7, n=1 to 6, x=1 to 5), and copper hydroxide. The great advantages enumerated below are derived from the present invention.

(1) The ratio of the copper to arsenic contents in the product can be freely selected in the range above 1.0.

(2) Since the product does not contain impurities suh as $Na^+$, $K^+$ and $SO_4^{2-}$, it gives birth to an antiseptic agent superior to the grade No. 1-A and equivalent to the grade No. 1-B when it is dissolved in an aqueous chromium trioxide solution.

(3) Since the product already incorporates therein copper and arsenic, all that is required is simply to have the product dissolved in an aqueous chromium trioxide solution. Through this treatment of dissolution which is simpler than the treatment heretofore involved, the product converts itself into a CCA type agent equivalent to the grade No. 1-B designated by Japanese Industrial Standard.

(4) The method of this invention yields a product which readily dissolves without involving any noticeable evolution of heat in a dilute or concentrated aqueous chromium trixoide solution.

(5) Since the method of this invention fully exploits the otherwise wasteful refinery's intermediate byproduct, it affords a great saving on cost as compared with the conventional method and provides efficient disposal of the arsenic content in the refinery's intermediate byproduct.

The product obtained by the method of this invention is a composite mixture of a copper-arsenic compound and copper hydroxide. The Cu/As ratio in this product, therefore, can be freely selected in the range over 1.0 by suitably changing the mixing ratio of the constituent compounds. Since Japanese Industrial Standard governs all products of this class as indicated below, all the products manufactured by this invention are destined to have Cu/As ratios within the range of 1.04 to 1.78.

No. 1-A-Cu/As ratio=1.04 to 1.67
No. 1-B-Cu/As ratio=1.15 to 1.78

A CCA type agent equivalent to No. 1-A, therefore, is prepared by combining a product of this invention, i.e., a composite copper-arsenic compound mixture having a Cu/As weight ratio within the range of 1.0 to 1.67, with chromium trioxide in such a proportion as to give a Cr/As weight ratio of 2.8 to 4.4 and dissolving the resultant mixture in a required amount of water.

Similarly a CCA type agent equivalent to No. 1-B is prepared by combining a product of this invention, i.e., a composite copper-arsenic compound mixture having a Cu/As weight ratio within the range of 1.15 to 1.78, with chromium trioxide in such a proportion as to give a Cr/As weight ratio of 2.8 to 3.9 and dissolving the resultant mixture in a required amount of water.

Now, the present invention will be described herein below with reference to working examples.

EXAMPLE 1

With a view to obtaining an aqueous solution containing copper sulfate and arsenic acid at a Cu/As concentration ratio (g/liter) of 1.3, 2.52 kg of a sulfide containing 2.67% of Cu, 8.47% of As, 0.12% of Bi, 0.02% of Sb, 9.16% of S and 77.8% of $H_2O$ respectively by weight and being obtained from the scrubbing of the waste gas of copper smelting furnaces was formed into slurry by addition of 825 g of copper sulfate ($CuSO_4.5H_2O$) and 880 ml of water. The slurry was charged in an autoclave having an inner volume of 5 liters and treated therein at a temperature of 120° C. under a partial pressure of oxygen of 2 kg/cm² for three hours. Then, the treated slurry was cooled to 30° C., kept at this temperature for one hour and subjected to suction filtration to separate a liquid extract. The residue of the filtration was stirred with 1 liter of water, and the resultant mixture was similarly subjected to suction filtration, to obtain a separate aqueous solution (washings). The results are shown in Table 7.

(slime) containing 40.2% of Cu, 20.3% of As, 0.91% of Sb, 1.42% of Bi, 7.84% of $SO_4$ and 27.8% of $H_2O$ respectively by weight and being obtained from the electrolysis for copper removal was formed into slurry by addition of 3.9 liters of water and 677 g of concentrated sulfuric acid (1.0 equivalent relative to Cu). The slurry was charged in an extraction reactor having an inner volume of 5 liters and oxidized with air blown in at a rate of 10 liters/minute under atmospheric pressure for three hours.

Then, the treated slurry was cooled to 20° C., kept at this temperature for one hour, and thereafter subjected to suction filtration, to separate a liquid extract. The residue which remained after the filtration was stirred with 2 liters of water and similarly subjected to suction

TABLE 7

|  | Cu | | As | | S g/l as $SO_4$ | Sb g/l | Bi g/l | Amount l | Cu/As ratio |
|---|---|---|---|---|---|---|---|---|---|
|  | g/l | Ratio of extraction % | g/l | Ratio of extraction % | | | | | |
| Liquid extract | 92.3 | | 71.0 | | 173.0 | 0.08 | <0.01 | 2.85 | 1.30 |
| Washings | 15.6 | | 12.1 | | 29.9 | 0.01 | <0.01 | 0.83 | |
|  |  | 99.0 | | 99.9 | | | | | |
| Residu of extraction (% by weight) | 0.39 | | 0.12 | | as S 95.9 | 0.15 | 1.76 | (g) 170 | |

From Table 7 it is noted that the Cu/As concentration ratio in the initially obtained liquid extract was 1.30, although the final washings were found to contain small amounts of copper and arsenic. A composite copper-arsenic compound mixture was obtained by neutralizing the liquid extract at pH 6.5 with sodium hydroxide.

EXAMPLE 2

With a view to obtaining an aqueous solution containing copper sulfate and arsenic acid at a Cu/As concentration ratio (g/liter) of 1.4, 1.07 kg of an arsenide filtration, to obtain an aqueous solution separately. The results given in Table 8 show that the Cu/As concentration ratio in the initial liquid extract was 1.40.

TABLE 8

|  | Cu | | As | | $SO_4$ g/l | Sb g/l | Bi g/l | Amount l | Cu/As ratio |
|---|---|---|---|---|---|---|---|---|---|
|  | g/l | Ratio of extraction % | g/l | Ratio of extraction % | | | | | |
| Liquid extract | 77.3 | | 55.0 | | 186 | 0.1 | 0.02 | 3.69 | 1.40 |
| Washings | 63.6 | | 6.2 | | 21.7 | 0.01 | <0.01 | 2.26 | |
|  | | 99.7 | | 99.8 | | | | | |
| Residue of extraction (% by weight) | 4.16 | | 1.39 | | <0.1 | 30.2 | 48.8 | 31 (g) | |

Then, 3 liters of the liquid extract indicated in Table 8 was charged in a neutralizing tank having an inner volume of 5 liters and neutralized to pH 6.5 by agitation thereof at room temperature with 200 g/liter of an aqueous sodium hydroxide solution added thereto. The precipitate which formed consequently was separated and washed by suction filtration. The results are shown in Table 9.

TABLE 9

|  | Cu | As | Cu/As | Na | Sb | Bi | $SO_4$ | $H_2O$ | Amount |
|---|---|---|---|---|---|---|---|---|---|
| Precipitate, weight % | 14.0 | 10.0 | 1.4 | <0.1 | <0.01 | <0.01 | <0.1 | 58.7 | 1.65 kg |
| Mother liquor | 0.008 | 0.006 | | 57.1 | 0.06 | 0.01 | 119 | | 3.69 l |

TABLE 9-continued

| | Cu | As | Cu/As | Na | Sb | Bi | SO$_4$ | H$_2$O | Amount |
|---|---|---|---|---|---|---|---|---|---|
| g/l | | | | | | | | | |

It is seen from Table 9 that a composite copper-arsenic compound mixture having a Cu/As concentration ratio of 1.40 was obtained in the form of a precipitate.

From the precipitate indicated in Table 9, a 500-g portion was weighed out in its unaltered form and dissolved at room temperature in 24.4 liters of an aqueous 12.7 g/liter chromium trioxide solution. Consequently, there was obtained an aqueous solution containing 6.55 g/liter of Cr, 2.84 g/liter of Cu and 2.03 g/liter of As. No insoluble residue was detectable in this aqueous solution.

This aqueous solution had a composition identical with the composition of an aqueous 2% solution of a No. 1-B CCA type wood-antisepticizing agent and, therefore, could be compressively injected in its unmodified form into wood as an antiseptic. A paste prepared by kneading the aforementioned composite copper-arsenic compound mixture and chromium trioxide, though not specifically cited herein as a working example, can be used similarly when it is diluted with a suitable amount of water.

While the present invention has been described with reference to particular examples thereof, it will be understood that numerous modifications may be made by those skilled in the art without actually departing from the spirit and scope of the invention as defined in the appended claims.

We claim:

1. A method of manufacturing a composite copper-arsenic compound mixture in the form of copper arsenate and copper hydroxide, said composite copper-arsenic compound mixture being useful in the formation of antiseptic agents, said method comprising
   a first step wherein a raw material which is composed of a sulfide containing copper and arsenic and is obtained as an intermediate byproduct from a nonferrous smelter or refinery is added to water to form a slurry; and wherein the copper and arsenic in the slurry are extracted into a liquid extract as copper sulfate and arsenic acid by adding a water-soluble cupric salt to the slurry, the extraction being conducted at a partial pressure of oxygen of not less than 1 kg/cm$^2$, a temperature of not less than 100° C. and a time period of not less than three hours, the water-soluble cupric salt, which acts as an accelerating agent for the oxidation of As(III) and the extraction of the copper sulfide, being adding in an amount sufficient to provide a copper concentration of not less than 20 g/liter of water in the slurry and thus provide a liquid extract having a Cu/As concentration ratio of not less than 1.0,
   a second step of cooling the liquid extract obtained in the first step to a predetermined temperature to thereby effect solid-liquid separation of the liquid extract, and
   a third step of adjusting the pH of the liquid resulting from the second step to a range of 6 to 7 to thereby cause copper and arsenic to precipitate as a composite mixture of copper arsenate and copper hydroxide, the mixture having a Cu/As concentration ratio of not less than 1.0.

2. The method according to claim 1, wherein said water-soluble cupric salt is at least one member selected from the group consisting of copper sulfate, copper chloride and copper nitrate.

3. The method according to claim 1 wherein said water-soluble cupric salt is added in such an amount as to give a copper concentration of not less than 50 g/liter of water in said slurry.

4. The method according to claim 1, wherein the extraction in said first step is carried out under a partial pressure of oxygen of not less than 2 kg/cm$^2$, at a temperature of not less than 120° C., and for a time period of not less than three hours.

5. The method according to claim 1, wherein the liquid extract obtained in said first step is additionally mixed with a water-soluble copper salt so as to increase the Cu/As concentration ratio above 1.0.

6. The method according to claim 1, wherein the Cu/As concentration ratio is adjusted within the range of 1.04 to 1.78.

7. The method according to claim 1, wherein the adjustment of the pH value of the liquid separated in said third step is effected by use of an alkali formed of one member selected from the group consisting of sodium hydroxide, potassium hydroxide and ammonium hydroxide.

8. A method of manufacturing a composite copper-arsenic compound mixture in the form of a mixture of copper arsenate and copper hydroxide, said composite copper-arsenic compound mixture being useful in the formation of antiseptic agents, said method comprising
   a first step wherein a raw material which is composed of an arsenide and an oxide containing copper and arsenic and is obtained as an intermediate byproduct from a nonferrous smelter or refinery is added to water to form a slurry; and wherein the copper and arsenic in the slurry are extracted into a liquid extract as copper sulfate and arsenic acid by adding sulfuric acid to the slurry, the extraction being conducted at a temperature of not less than 50° C. and with the injection of blown air for a time period of not less than three hours, the sulfuric acid being added in an amount, sufficient to provide a Cu/As concentration of not less than 1.0 in the liquid extract,
   a second step of cooling the liquid extract obtained in the first step to a predetermined temperature to thereby effect solid-liquid separation of the liquid extract, and
   a third step of adjusting the pH of the liquid resulting from the second step to a range of 6 to 7 to thereby cause copper and arsenic to precipitate as a composite mixture of copper arsenate and copper hydroxide, the mixture having a Cu/As concentration ratio of not less than 1.0.

9. The method according to claim 8, wherein the extraction in said first step is carried out as a temperature of not less than 60° C. and with the continued injection of blown air for a time period of not less than three hours.

10. The method according to claim 8, wherein at least one member selected from the group consisting of copper sulfate, copper chloride and copper oxide is further added to the slurry to increase the Cu/As concentration ratio above 1.0.

11. The method according to claim 8, wherein the liquid extract obtained in said first step is additionally mixed with a water-soluble cupric salt to increase the Cu/As concentration ratio above 1.0.

12. The method according to claim 8, wherein the Cu/As concentration ratio is adjusted to within the range of 1.04 to 1.78.

13. The method according to claim 8, wherein the adjustment of the pH value of the liquid separated in said third step is effected by use of an alkali formed of one member selected from the group consisting of sodium hydroxide, potassium hydroxide and ammonium hydroxide.

* * * * *